United States Patent
Deason et al.

(10) Patent No.: US 7,432,473 B2
(45) Date of Patent: Oct. 7, 2008

(54) ELECTROFUSION MACHINE WITH IMPROVED FUNCTIONS

(76) Inventors: Mike T. Deason, 2820 Commerce Blvd., Birmingham, AL (US) 35210; Nam-Hoon Lee, 2-407 Seongchang Apt., 999-2, Unyang-dong, Gimpo, Kyeonggi-do 145-742 (KR)

( * ) Notice: Subject to any disclaimer, the term of this patent is extended or adjusted under 35 U.S.C. 154(b) by 548 days.

(21) Appl. No.: 10/949,445

(22) Filed: Sep. 24, 2004

(65) Prior Publication Data

US 2006/0086711 A1    Apr. 27, 2006

(51) Int. Cl.
*H05B 1/00* (2006.01)
*H02M 7/5383* (2007.01)

(52) U.S. Cl. .......................... 219/216; 363/78; 363/79; 363/205

(58) Field of Classification Search ............. 219/240–1, 219/482–5, 487, 492, 497, 494, 216, 533, 219/535; 156/64, 304.2, 304.6, 359, 328; 363/74, 78–9, 205, 266, 274–5, 280
See application file for complete search history.

(56) References Cited

U.S. PATENT DOCUMENTS 4,978,837 A * 12/1990 Eggleston ................... 219/497
5,788,789 A *  8/1998 Cooper ......................... 156/64

\* cited by examiner

*Primary Examiner*—Shawntina Fuqua
(74) *Attorney, Agent, or Firm*—Tuchman & Park LLC

(57) ABSTRACT

A portable electrofusion machine includes: a power supply circuit having a triac configured to have a proper regulation for dropping a commercial voltage to a voltage adapted for a fitting; and a printer unit integrated with the electrofusion unit, for printing information regarding a work result of the fitting. According to the above construction, since the electrofusion machine does not use a transformer occupying 40% of a total weight of the machine, the mobility and portability are enhanced. Also, since the size of the machine is reduced, it is advantageous to deal with the machine on the spot.

3 Claims, 5 Drawing Sheets

ELECTROFUSION MACHINE WITH IMPROVED FUNCTIONS

FIELD OF THE INVENTION

The present invention relates to an electrofusion machine having an improved performance, and more particularly, to an electrofusion machine having reduced weight to enhance the mobility and portability, and capable of reporting a work result on the spot.

DESCRIPTION OF RELATED ART

An electrofusion machine was developed for bonding or branching a gas pipe or a water supply and drainage pipe having polyethylene- or ethylene-based copolymer as a main raw material.

To bond two polyethylene pipes using the electrofusion machine, a polyethylene bonding material having a heating wire or heating element therein is placed on a bondage surface between the polyethylene pipes and a fitting, each of the two polyethylene pipes is inserted into both ends of the fitting, and current is supplied to the heating wire or heating element, so that heat is generated from the heating wire or heating element and thus inner surfaces of the fitting and outer circumferences of the pipes are bonded to each other by melting expansion and compression.

FIG. 1 is a power supply circuit of a related art electrofusion machine.

When a power is supplied to a pair of power input terminals 10 and 10a, the power is controlled by a triac 15, and it drops from 110V to 40V through a transformer. The dropped power is outputted through output terminals 20 and 20a of the transformer, and supplied to a load 40 through load terminals 30 and 30a and an output cable 100.

The output voltage applied between the output terminals 20 and 20a of the transformer is stabilized through a voltage stabilizing unit 200.

In other words, the output voltage applied between the output terminals 20 and 20a is amplified at a constant gain by an OP amp 50, and the amplified output is applied to an inverting terminal of an OP amp 60. A reference voltage 15 is applied to a noninverting terminal of the OP amp 60 so that the OP amp 60 outputs an output voltage whose sum becomes zero. A triac driving unit 70 amplifies the output voltage to control On/Off of the triac 15.

By repeating the above operation, the stabilized voltage is supplied to the load terminals 30 and 30a through the output cable 100.

In the electrofusion machine having the power supply circuit, since the voltage is dropped by the transformer, the electrofusion machine has an advantage that a small capacitance for the triac 15 is allowed. However, the transformer increases the weight of the electrofusion machine itself, so that the mobility and portability are not good.

In the meanwhile, to report a work result directly on the spot after the electrofusion process is completed, separate portable computer and portable printer should be purchased.

In particular, it takes much time in connecting the portable computer with the portable printer. Also, there sometimes exists a high possibility in installation error.

Further, since most of portable printers support A4 size paper, it is inconvenient to deal with the paper upon considering circumstances of the spot.

SUMMARY OF THE INVENTION

Accordingly, the present invention is directed to an electrofusion machine that substantially obviates one or more problems due to limitations and disadvantages of the related art.

An object of the present invention is to provide an electrofusion machine having reduced weight to enhance the mobility and portability, and capable of reporting a work result on the spot.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an improved electrofusion machine comprising: a power supply circuit having a triac configured to have a proper regulation for dropping a commercial voltage to a voltage adapted for a fitting; and a printer unit integrated with the electrofusion unit, for printing information regarding a work result of the fitting.

According to the above construction, since the electrofusion machine does not use a transformer occupying 40% of a total weight of the machine, the mobility and portability are enhanced. Also, since the size of the machine is reduced, it is advantageous to deal with the machine on the spot.

Preferably, the electrofusion machine may further include a cover for covering the printer unit.

According to the above construction, the printer unit can be prevented from being damaged due to an external impact when the printer unit is not used.

Also, a printing paper receiving groove for receiving a roll-type printing paper may be formed adjacent to the printer unit and is covered together with the printer unit by the printer cover. Alternatively, a pocket of clothing or leather may be formed at an inner surface of the cover to receive a printing paper therein.

According to the above construction, the printing paper can be prepared always and sufficiently. An overall appearance looks good.

Preferably, an output cable may be received in the electrofusion machine.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

Reference will now be made in detail to the preferred embodiments of the present invention, examples of which are illustrated in the accompanying drawings.

Figure 2:
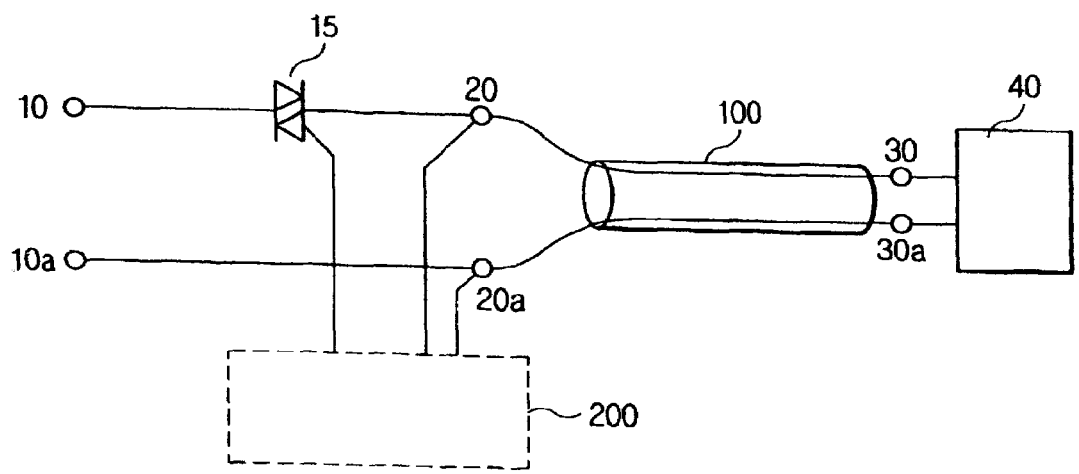
FIG. 2 is a power supply circuit of an electrofusion machine according to the present invention.

FIG. 2 is a power supply circuit of an electrofusion machine according to the present invention.

Figure 1:
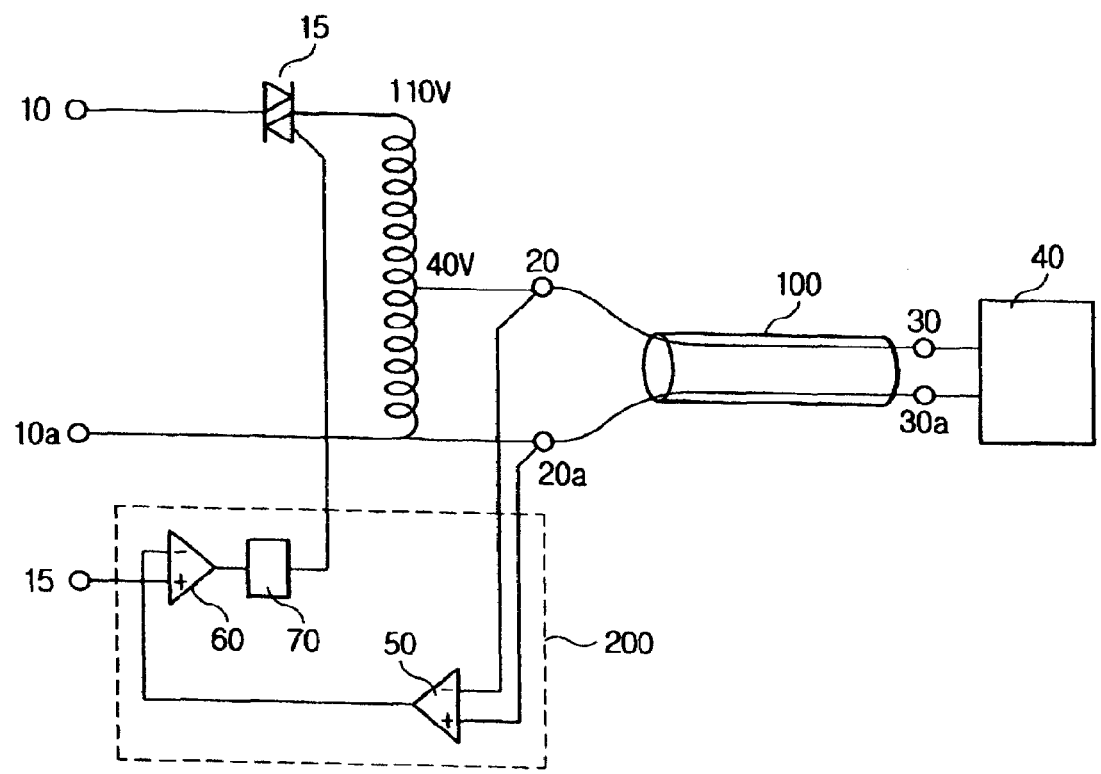
FIG. 1 is a power supply circuit of a related art electrofusion machine.

Unlike in FIG. 1, the electrofusion machine in FIG. 2 does not employ a transformer but employs a triac 115 so as to drop a commercial voltage to a voltage adapted for an application to a fitting.

According to the present invention, since the price of the triac fell considerably, an economical load is not large. Also, since the electrofusion machine of the present invention does not employ the transformer occupying 40% weight of a total weight, the mobility and the portability are enhanced.

Also, since the weight and the size of the machine are reduced, it is advantageous to deal with the machine on the spot.

Figure 3:
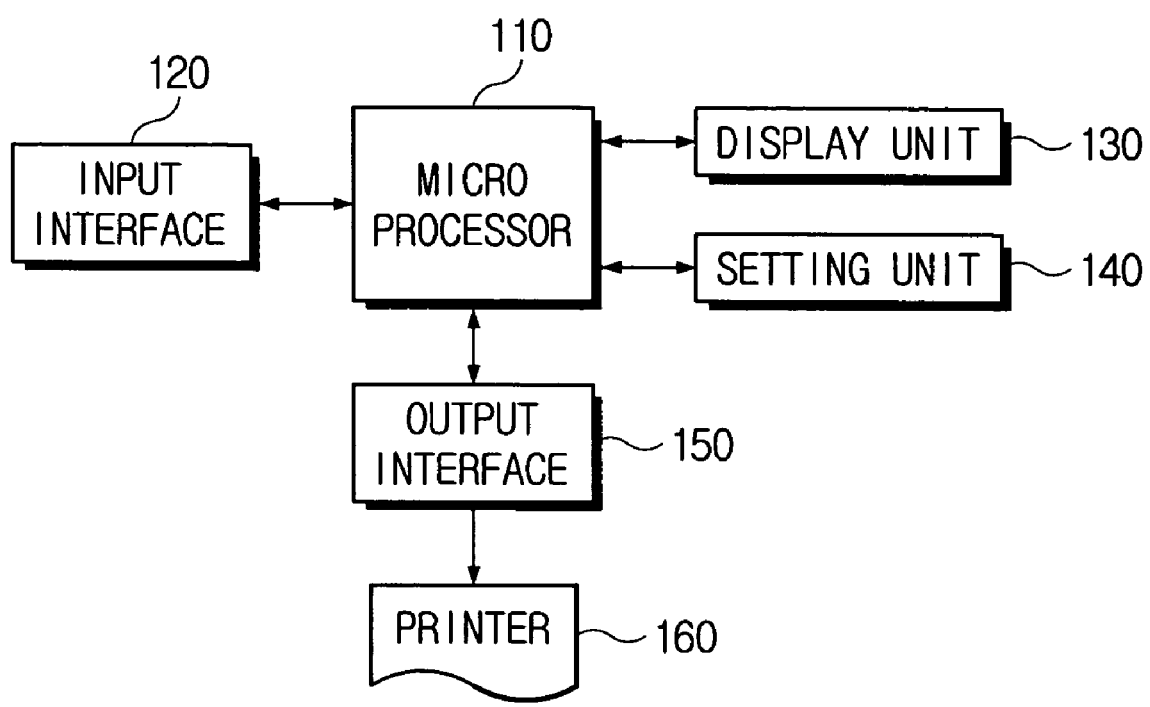
FIG. 3 is a block diagram showing a function construction of an electrofusion machine.

FIG. 3 is a block diagram showing a function construction of an electrofusion machine.

Referring to FIG. 3, an input interface 120 provides a microprocessor 110 with various information inputted through an output cable 100.

A display unit 130 displays information set by a user or an advancing procedure of a fitting work to the user. A liquid crystal display (LCD) may be used as the display unit 130.

A setting unit 140 receives a variety of parameters for the fitting work and provides the received parameters to the microprocessor 110.

An output interface 150 drives a printer unit 160 according to a control of the microprocessor 110 such that various information related with various fitting works are printed out.

Preferably, the information related with the fitting work may include a spot number, date, external temperature, output voltage, output current, pipe regulation, cooling time, fusion result and the like.

Thus, an information report related with the fitting work printed out through the printer unit 160 is provided to and approved by a supervisor on the spot.

The microprocessor 110 has a drive program therein, and controls fusion temperature, time, traction pressure, cooling time, compression time or the like. Also, the microprocessor 110 always checks out the output voltage or the output current to stop the fusion when abnormal operation is generated.

Figure 4:
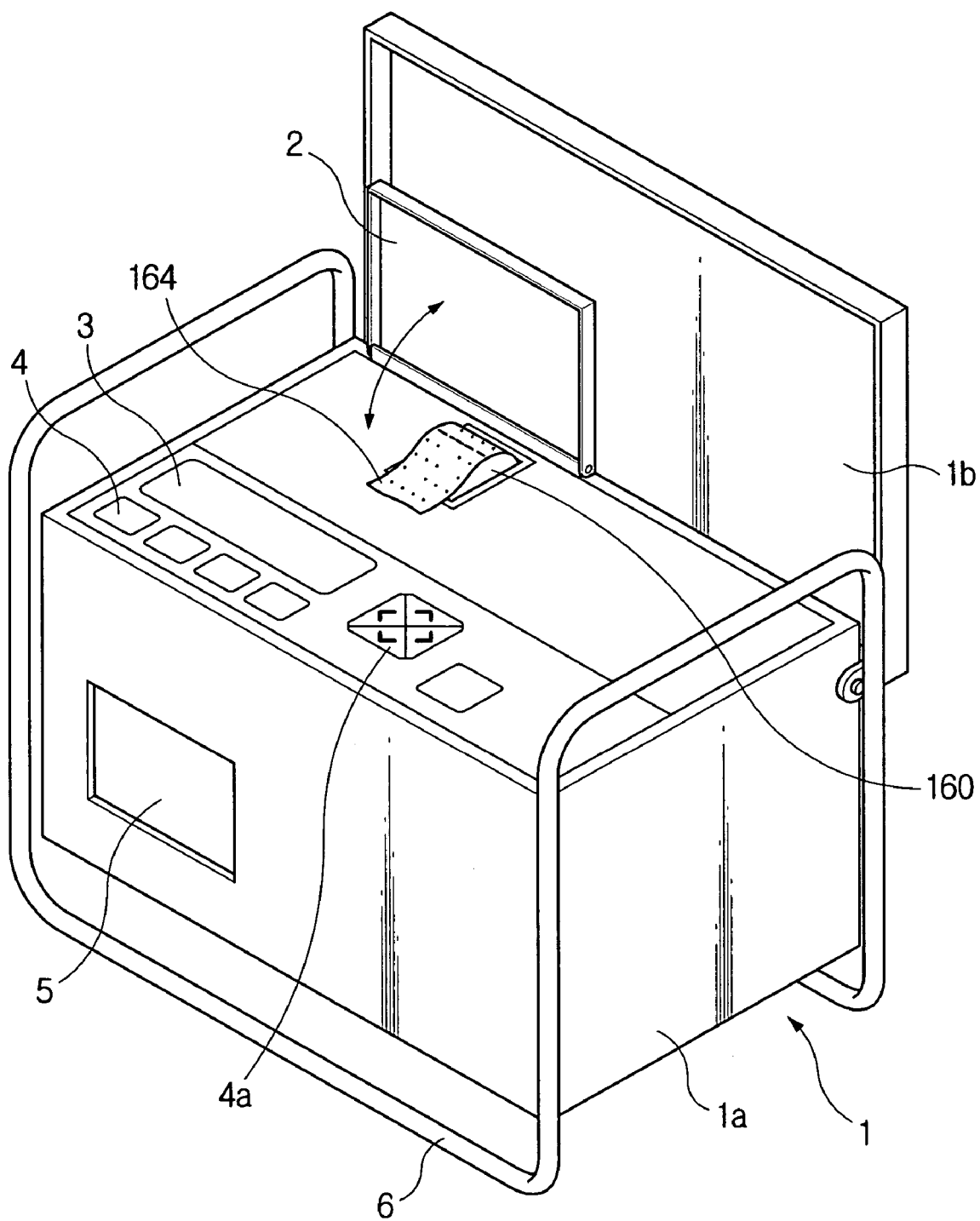
FIG. 4 is a perspective view of an electrofusion machine according to an embodiment of the present invention.

FIG. 4 is a perspective view of an electrofusion machine according to an embodiment of the present invention.

Referring to FIG. 4, the electrofusion machine includes an outer box 1a and a cover 1b, and is wholly fixed by a support frame 6.

A handle (not shown) is attached to the cover to provide a convenience in movement and carriage. If the cover 1b is opened, a printer unit 160, a display unit 3, functional buttons 4 and directional selection buttons 4a installed on an upper surface of the outer box 1b are shown.

The printer unit 160 is provided with a roll type printing paper 164. Considering the paper size, the printing is preferably performed by a dot matrix method, a heat transfer method, or an inkjet injection method.

Preliminary printing papers are kept in a pocket (not shown) formed of clothing or leather at an inner surface of the cover 1b.

Preferably, the printer unit 160 is separately covered by a printer cover, which is hinge-coupled to the printer unit 160. When the printer unit 160 is not used, it can be covered by the printer cover 2. In FIG. 4, non-described symbol 5 represents a custody box for receiving the output cable.

By the above construction, when the printer unit 160 is not used, the printer unit 160 can be prevented from being damaged by an external impact.

Figure 5:
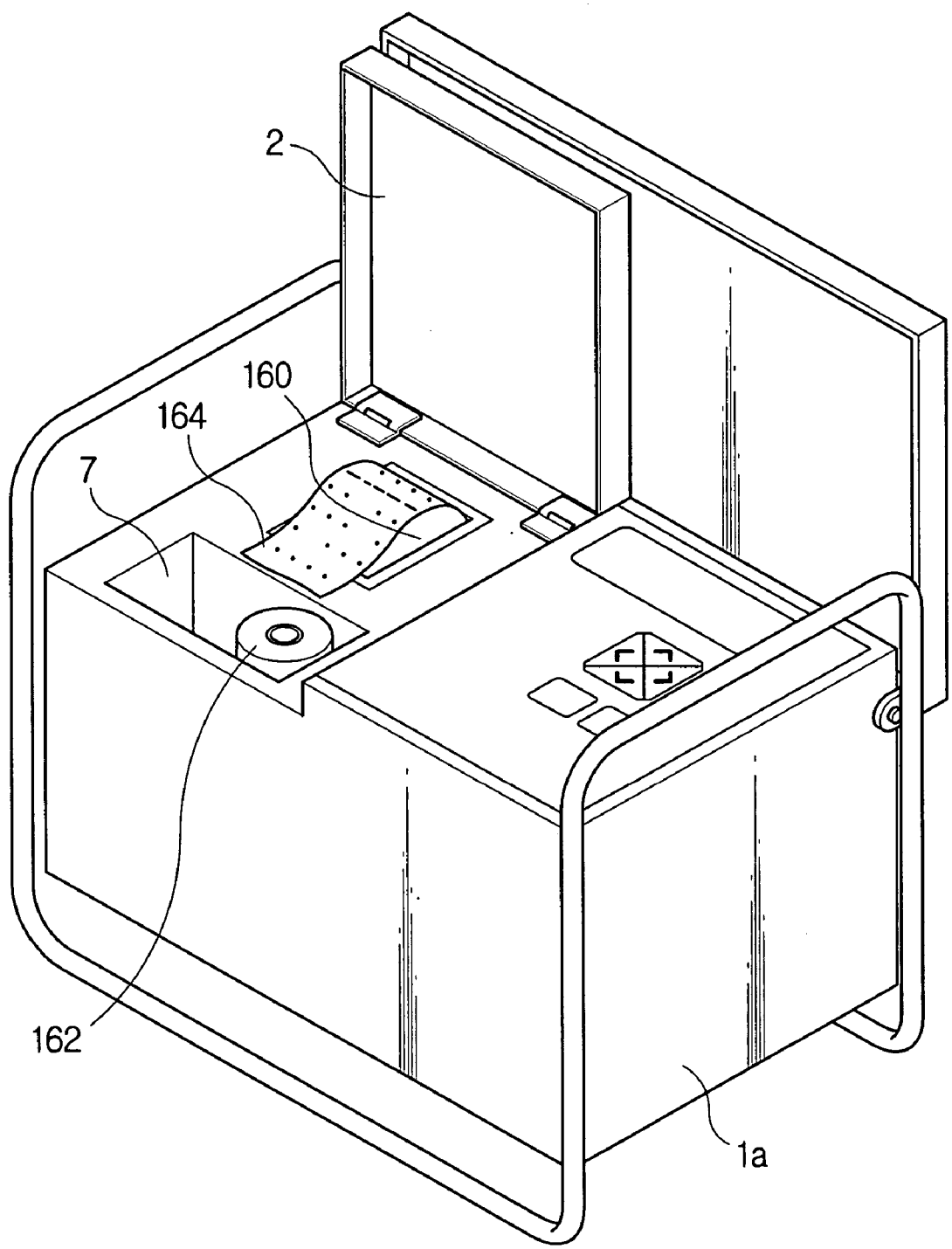
FIG. 5 is a perspective view of an electrofusion machine according to another embodiment of the present invention.

FIG. 5 is a perspective view of an electrofusion machine according to another embodiment of the present invention.

Referring to FIG. 5, an outer box 1a is divided into two regions having different heights. A display unit and a plurality of buttons are installed at a region having a higher height, and a printer unit 160 is installed at a region having a lower height. A printing paper receiving groove 7 for receiving and keeping a roll-type printing paper is formed adjacent to the printer unit 160.

Also, a printer cover 2 has a width and a length that are able to cover both the printer unit 160 and the printing paper receiving groove 7, and also has a height to form the same plane as the region having the higher height.

According to the above construction, the printing paper can be prepared always and sufficiently. Also, an overall appearance looks good.

Figure 6:
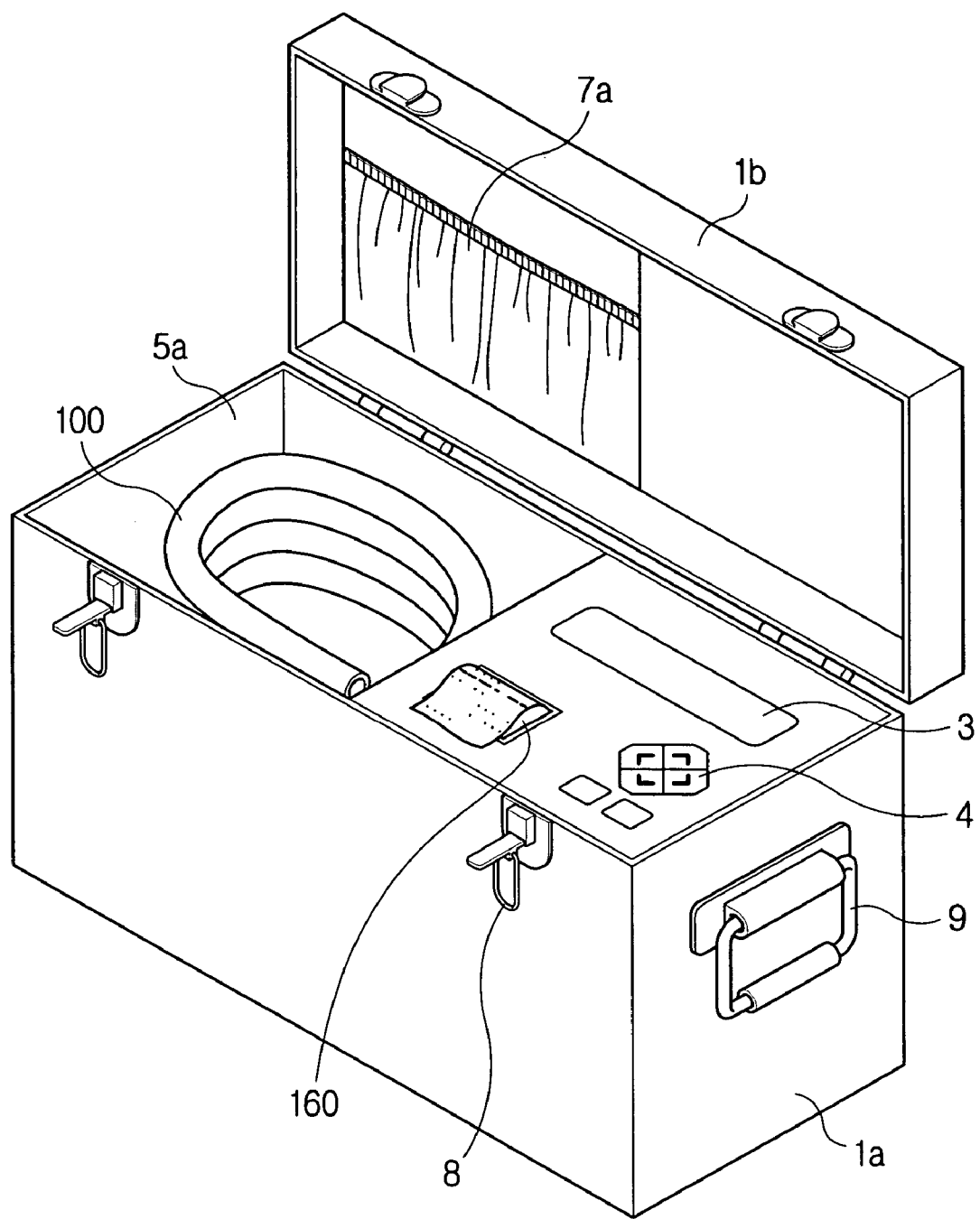
FIG. 6 is a perspective view of an electrofusion machine according to another embodiment of the present invention.

FIG. 6 is a perspective view of an electrofusion machine according to another embodiment of the present invention.

Referring to FIG. 6, an outer box 1a is divided into two regions. A custody box 5a for keeping an output cable 100 is installed at a first region, and a printer unit 160, a plurality of functional buttons 4 and a display unit 3 are installed at a second region.

Also, a pocket 7a of clothing or leather is formed at an inner surface of a cover 1b to receive a printing paper therein.

The cover 1b and the outer box 1a are simply locked by a locking unit. A handle 9 is also installed to conveniently carry the electrofusion machine.

According to the present invention, since the price of the triac fell considerably, an economical load is not large. Also, since the electrofusion machine of the present invention does not employ the transformer occupying 40% weight of a total weight, the mobility and the portability are enhanced.

Further, since the weight and size of the machine are reduced, it is advantageous to deal with the machine on the spot.

Furthermore, since an information report related with the fitting work printed out through the printer unit is directly provided to a supervisor on the spot, an approval to a fusion result can be performed rapidly.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A portable electrofusion machine comprising:
   a power supply circuit having a triac configured to have a proper regulation for dropping a commercial voltage to a voltage adapted for a fitting;
   a printer unit integrated with the electrofusion machine, for printing information regarding a work result of the fitting;

a printing paper receiving room formed adjacent to the printer unit for storing a printing paper therein to supply the printing paper to the printer unit for future use; and a cover for covering the printer unit and the printing paper receiving room;

wherein the power supply circuit does not include a transformer for the dropping the commercial voltage to the voltage adapted for the fitting such that the weight and volume of the electrofusion machine is reduced to enhance the mobility and portability of the electrofusion machine.

2. A portable electrofusion machine comprising, an outer box having an upper surface, the upper surface including first and second region with different heights, the height of the first region lower than the height of the second region;

a power supply circuit having a triac configured to have a proper regulation for dropping a commercial voltage to a voltage adapted for a fitting, the power supply circuit contained in the outer box;

a display unit and function input buttons disposed at the second region of the outer box;

a print unit integrated with the electrofusion machine and a printing paper receiving room disposed at the first region of the outer box; and a print cover openably coupled with and covering the entire first region of the outer box and without covering the second region of the outer box;

wherein the second region and the first region covered with the print cover together define a substantially planar upper surface.

3. A portable electrofusion machine comprising:

an outer box having an upper surface, the upper surface including first and second regions with different heights, the height of the first region lower than the height of the second region;

a printer unit, integrated with the electrofusion machine and contained in the outer box for printing information regarding a result of the machine operation and a printer cover for covering the printer unit, the print unit and the print cover installed in the first region;

a display unit and function input buttons installed in the second region;

a cover openably coupled with the outer box; and a power supply circuit having a triac configured to have a proper regulation for dropping a commercial voltage to a voltage adapted for a fitting, the power supply circuit contained in the outer box;

wherein a printing paper receiving groove for receiving a roll-type printing paper is formed adjacent to the printer unit is covered together with the printer unit by the printer cover.

* * * * *